United States Patent [19]

Kreager, Jr. et al.

[11] Patent Number: 4,950,345

[45] Date of Patent: Aug. 21, 1990

[54] METHOD AND APPARATUS FOR MAKING IMPROVED SEALS BETWEEN POLYMERIC FILM MATERIALS

[75] Inventor: William D. Kreager, Jr., Dallas; Jerry M. Reaves, Midlothian; Frederick J. Prigge, Dallas, all of Tex.

[73] Assignee: Frito-Lay, Inc., Dallas, Tex.

[21] Appl. No.: 307,238

[22] Filed: Feb. 7, 1989

Related U.S. Application Data

[63] Continuation-in-part of Ser. No. 129,283, Dec. 7, 1987, abandoned.

[51] Int. Cl.⁵ .............................................. B29C 53/00
[52] U.S. Cl. ....................................... 156/203; 53/451; 156/218; 156/308.4; 156/466; 493/197; 493/269; 493/302

[56] References Cited

U.S. PATENT DOCUMENTS

| | | | |
|---|---|---|---|
| 3,042,103 | 7/1962 | McDevitt et al. | 493/302 |
| 3,935,048 | 1/1976 | Rucker | 156/203 |
| 4,529,471 | 7/1985 | Vaughan | 156/466 |

Primary Examiner—John J. Gallagher
Attorney, Agent, or Firm—Bernard, Rothwell & Brown

[57] ABSTRACT

A back-up pad is provided over an anvil surface of a back-up plate, and between the anvil surface and a sealing surface of a sealing die, in an apparatus for forming seals between layers of film material. The back-up pad has a slip surface on one side thereof and a spring surface on an oppposite side thereof, the slip surface opposing the sealing face of the die so that the layers of film material pass between the sealing die and the back-up pad during seal formation. The spring surface is comprised of a plurality of outwardly extending resilient spring loops that act against the back-up plate during seal formation, the spring loops resiliently urging the layers of film material against the sealing face to effect seal formation between the film layers while cushioning the film layers to prevent damage to the film layers due to drag between layers and the die face.

21 Claims, 6 Drawing Sheets

METHOD AND APPARATUS FOR MAKING IMPROVED SEALS BETWEEN POLYMERIC FILM MATERIALS

CROSS-REFERENCE TO RELATED APPLICATION

The present application is a continuation-in-part of U.S. patent application Ser. No. 129,283, filed Dec. 7, 1987, now abandoned.

BACKGROUND OF THE INVENTION

1. Field of the Invention

The present invention relates to improvements in methods and apparatus for forming seals between film materials, such as in packaging.

2. Description of the Background Art

Bags for potato chips or other snack food products typically are formed, filled and sealed in a substantially continuous operation. To produce a bag, polymeric sheet material typically is formed into a tube by bringing the edges of the material into engagement as the material passes over a tube-forming collar. A portion of the tube corresponding to an end of a bag is gripped and sealed by jaws to form a closed-end tube. The jaws move downward, pulling the closed-end tube past a device which seals the engaged edges of the tube between a sealing die and a back-up plate by application of heat and pressure to the edges to form a back seal along the closed-end tube. The closed-end tube may be filled with product from a suitable device at substantially the same time that it is being back-sealed, or immediately thereafter. The jaws then release the sealed end and move upward along the length of the closed-end tube. The jaws stop and close together at a point corresponding to the opposite end of a product-filled bag to seal the end of the tube containing product to form the filled bag. The jaws simultaneously seal the end of the next tube and then move downward to effect the back seal of the newly-formed, close-end tube. The formed bag may be separated from the continuous material when the jaws are at their lowermost position.

During movement of the jaws downwardly while gripping the closed-end tube, the engaged edges of the tube are moved quickly past the back-sealer to form a "slip" area of the back seal. However, when the tube remains stationary after the jaws release the sealed end and move upward along the length of the closed-end tube, a portion of the engaged edges of the tube remain stationary, and within the sealing device for considerably longer than during movement of the tube, to form a "dwell" area of the back seal. Because of this variation in the residence time of tube edges within the back sealing device, the quality of the "dwell" and the "slip" areas of the seal often are inconsistent, particularly with certain types of film material. This may result in defectively sealed bags.

Defectively sealed bags often go undetected until the product moves into retail commerce. The customer may buy the package and be quite unaware that it has a defective seal. The faulty seal, however, may have caused the product to lose freshness and the customer is dissatisfied. Also, the customer may return the product to the store for exchange or a refund. Since by this time the whole chain of commercial transactions has occurred, the refund or exchange is generally accounted for by some type of back transactions giving credit to the retailer, route man and the like until reaching the product manufacturing stage. This is a costly and time-consuming process. Accordingly, there remains a need in the art for methods and apparatus for forming consistently high quality back seals in form and fill machines.

SUMMARY OF THE INVENTION

The present invention provides a method and apparatus for sealing together layers of sealable film material utilizing a sealing die and back-up plate, between which the layers of film pass during formation of a seal between the film layers. The sealing die has a sealing face, and the back-up plate has an anvil surface that opposes the sealing face of the die. A back-up pad is provided over the anvil surface of the back-up plate. The back-up pad has a slip surface on one side thereof and a spring surface on an opposite side thereof, the slip surface opposing the sealing face of the die so that the layers of film material pass between the sealing die and the slip surface of the back-up pad during seal formation. The spring surface of the back-up pad includes a plurality of inwardly extending resilient spring loops that act against the anvil surface during seal formation. The spring loops resiliently urge the layers of film material against the sealing face of the sealing die to affect seal formation between the film layers while cushioning the film layers to prevent damage to the film layers due to drag between the film layers and the die face.

DETAILED DESCRIPTION OF THE PREFERRED EMBODIMENTS

The present invention is applicable to bag forming machines that form a continuous sheet of film material into a tube with edges of the tube overlapping and engaged prior to sealing the engaged edges by heat sealing or other suitable means. The invention is applicable to devices that form "lap" type seals, as well as devices that form fold over or "fin" seals. Such machines include "drag" type, "reciprocated drag" type, "reverse reciprocated intermitent" type or "continuous motion" type package maker system using lap or fin seal configurations.

Figures 1, 3:
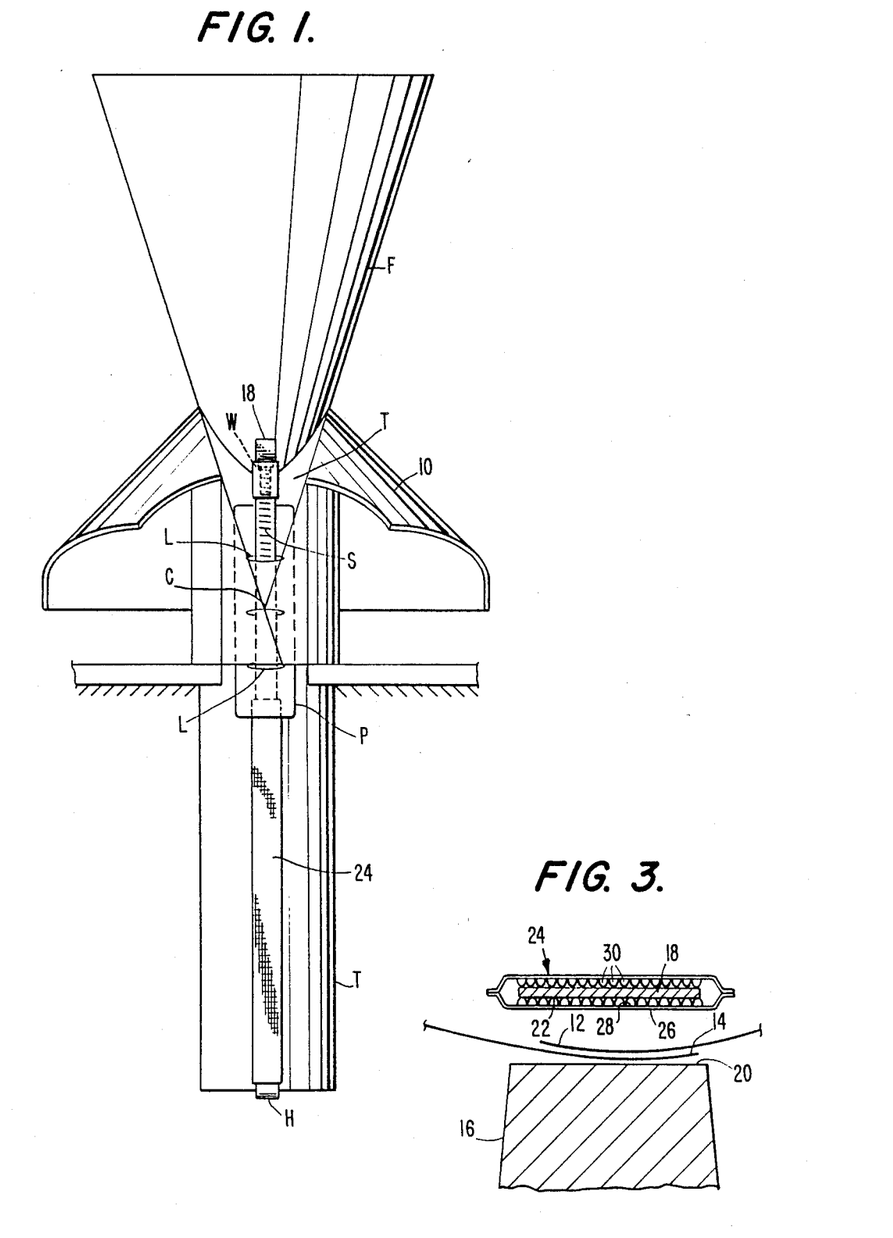
FIG. 1 is an elevation view showing a bag forming apparatus with sealing die removed, utilizing a back-up pad in accordance with one embodiment of the present invention for continuous back seal formation between polymeric film layers.
FIG. 3 is a cross-sectional view of a back-up pad installed on a back-up plate in accordance with one embodiment of the present invention.

The invention is shown in the environment of one such bag forming device in FIG. 1. The apparatus shown in FIG. 1 includes a conventional tube forming collar 10 over which bag forming polymeric sheet material passes as it is formed into a tube with overlapping edges 12 and 14 of the polymeric film for forming a "lap" seal as shown in FIG. 3. The film material can be any suitable sealable film or sheet material known in the art for forming bags for snack food items and the like.

The overlapped layers of polymeric film are drawn between a heated sealing die 16 and a back-up plate 18 which, accordingly to this embodiment, is in the form of a tension band. The tension band back-up plate 18 is mounted on a funnel/fill tube assembly that guides food product into the bags as they are formed. The funnel/fill tube assembly includes a funnel portion F, generally of metal, welded to a product fill tube T that extends within the polymeric tube of bag-making material.

The tension band back-up plate 18 includes a lower hook H (shown in detail in FIG. 6) that engages the bottom edge of fill tube T. Plate 18 further includes an angularly slotted top portion having slots S that threadably engage a complementary worm screw W mounted on a support that is welded to the forward junction of the funnel F and the product fill tube T. In the arrangement shown in FIGS. 1 and 6, tightening of worm screw W increases the tension on back-up plate 18.

With reference to FIG. 3, the sealing die 16 has a heated sealing face 20 that opposes an anvil surface 22 of the back-up plate 18.

In accordance with the present invention, a back-up pad 24 is provided over the anvil surface 22 of back-up plate 18. The back-up pad 24 has a slip surface 26 on one side thereof and a spring surface 28 on an opposite side thereof.

As shown in FIG. 3, the slip surface 26 of back-up pad 24 opposes the sealing face 20 of die 16 so that the overlapping layers of film material pass between the sealing die and the back-up pad during seal formation. The spring surface 28 is comprised of a plurality of inwardly extending resilient spring loops 30 that act against the back-up plate 18 during seal formation. The spring loops 30 resiliently urge the overlapping layers of film material against the heated sealing face 20 of die 16, to effect seal formation between the film layers while cushioning the film layers to prevent damage thereto due to drag between the film layers and die face 20. The back-up pad also serves to minimize heat losses to its supporting mounting band or the more massive standard back-up fill tube anvil surfaces. The amount of heat required to seal may therefore be reduced as transmission is only to the film plies to be sealed. The degrees of film distortion corresponding to "slip" and "dwell" zones of the seal are minimized by the multifunctional seal pad, having spring action, slip action, and insulating properties.

Figure 2:
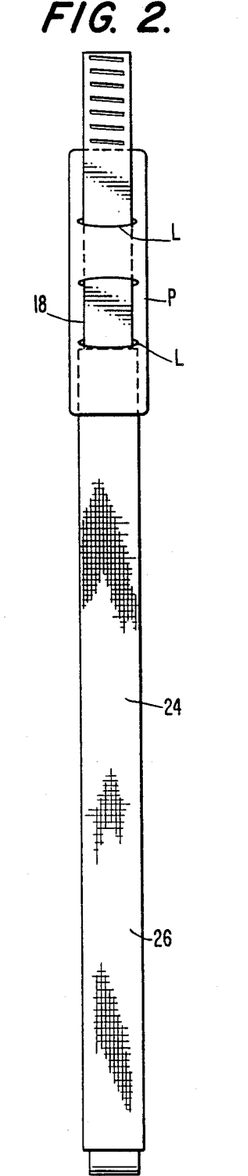
FIG. 2 is a detailed elevation view of a back-up pad in accordance with the present invention installed on a back-up plate, as in the embodiment shown in FIG. 1.

In the embodiment illustrated in FIGS. 1–3, back-up pad 24 is formed from a modified type of commercial fastening material known as Velcro TM. This modification to Velcro TM alters its normal properties in such a way that it no longer has capabilities for characteristic fastening with its companion fibrous mat. The normal Velcro TM "hook" material is formed by cutting each outwardly extending monofilament loop as it is manufactured, see, e.g., U.S. Pat. Nos. 3,009,235 and 3,594,873. However, according to the present invention as shown in FIGS. 1–3, the Velcro TM-type material has been modified by providing uncut loops extending outwardly from the woven material, which act as springs when pressure is applied to individual or multiples of the loops. Typically, the diameters of loops 30 are between about 0.5–2.5 mm, most often between about 1–2 mm. The loops usually are provided in rows, each row having about 6–10 loops/cm, e.g., 8 loops/cm. The density of the rows usually is within the range of about 8–14 rows/cm, e.g., 10–12 rows/cm. Generally, the loops are formed of monofilament polymeric line having a thickness of about 0.025–0.075 mm (about 0.001–0.003 inch), preferably about 0.05 mm (about 0.002 inch).

In preferred embodiments, back-up pad 24, including loops, 30 is manufactured entirely of polyester, giving the pads good resistence to oils and high stability under a heated condition. Polyester is fully acceptable by the U.S. Food and Drug Administration for incidental contact with a food product, and further provides the slip surface 26 of pad 24 with a low co-efficient of friction to packaging film materials in a bag making process.

Figure 6:
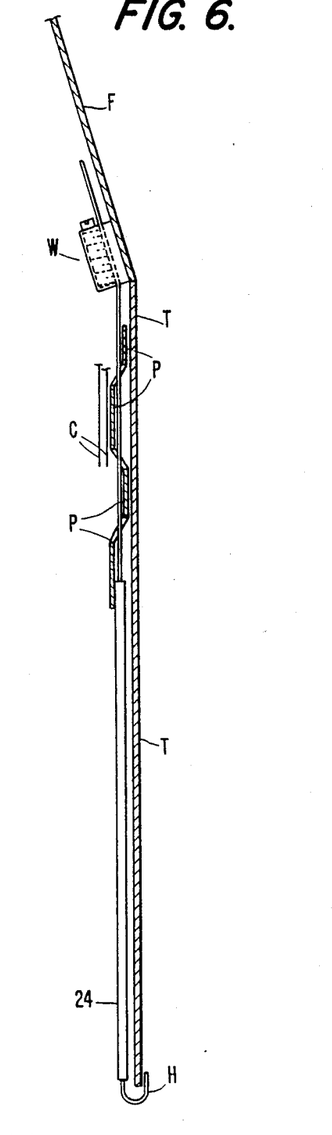
FIG. 6 is a schematic cross-sectional view of the mounting of a tension band back-up plate on the apparatus shown in FIG. 1.

In particularly preferred embodiments, a flexible shield P, preferably all polyester, is mounted on the tension band back-up plate 18 in the region of the bag former cross-over area C. Shield P is mounted on plate 18 by snaking the plate 18 through slots L in the shield. As shown in FIGS. 1, 2 and 6, the lower portion of shield P extends over the top portion of the back-up pad 24. Shield P assists in the passage of the packaging film over the pad mounting plate 18 as it enters and exists the former cross-over area C, and provides a smooth transition for the film as it is pulled down initially over the surface of back-up pad 24.

The heated die face or platen 20 can be of any suitable size. Beneficially, it should not be wider than the desired seal. Applications of heat and pressure to the die face or platen 20 is based on the seal requirements of the particular packaging film being used. Generally, the sealing temperature is no greater than about 177° C. (about 350° F.), with a pressure low enough to assure that the spring loops 30 are not loaded past their point of proper residual flex in all seal modes.

Figure 4:
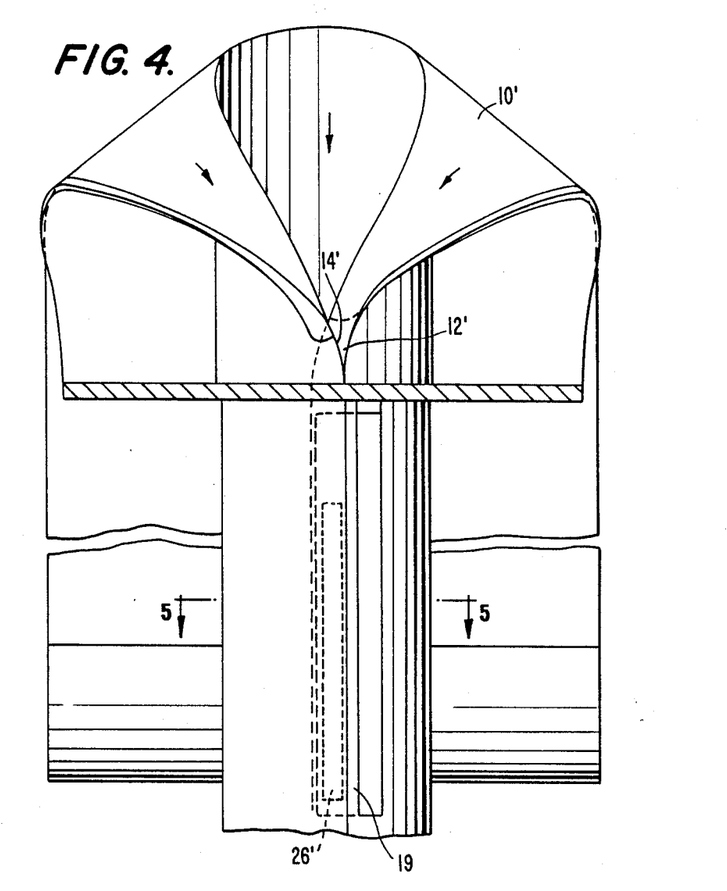
FIG. 4 is an elevation view showing utilization of a back-up pad in accordance with a second embodiment of the invention.
Figure 5:
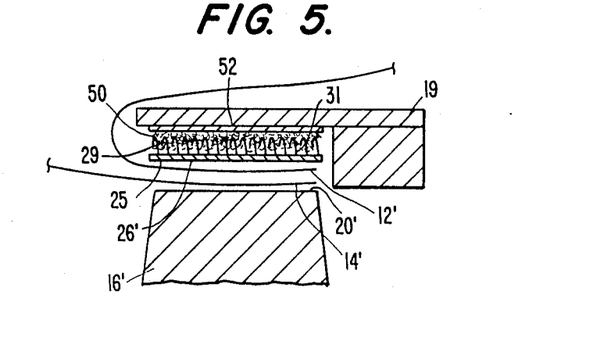
FIG. 5 is a cross-sectional view along line 5—5 of FIG. 4.

In the embodiment shown in FIGS. 4 and 5, a modified form of the invention is utilized in an apparatus for forming a foldover or "fin"-type back seal. As in the previous embodiment, the apparatus includes a conventional tube forming collar 10'.

Edges 12' and 14' of the polymeric film are folded over and layered to form a "fin," and passed between a sealing die 16' and a back-up "tucker" plate 19 for forming the back seal. This embodiment differs from the previously described embodiment in that the back-up pad 25 includes a plurality of cut loops that are cut to form hooks 31 as in typical Velcro TM fabric. In this embodiment, a strip of conventional Velcro TM fibrous companion mat 50, made of polyester is utilized. A back-side 52 of the Velcro TM companion mat 50 is coated with adhesive and applied to the anvil surface of the back-up "tucker" plate 19. To this Velcro TM companion mat 50 is applied a back-up pad 25 of conventional Velcro TM, having inwardly extending cut loops 31. The back-up pad 25 has a slip surface 26' on one side thereof and a spring surface 29 on an opposite side thereof. As shown in FIG. 5, the slip surface 26' of back-up pad 25 opposes the sealing face 20' of die 16' so that the layers of film material pass between the sealing die and the back-up pad during seal formation. The spring surface 29 is comprised of a strip of all-polyester Velcro TM loop material, conventionally cut to form "hooks" 31, so that the "hooks" are buried into the fibrous companion mat 50. The hooks 31 can thereby act against the back-up plate during seal formation to urge the layers of film material against the sealing face 20' of sealing die 16', to affect seal formation between the film layers, while cushioning the film layers to prevent damage to the film layers due to drag between the film layers and the die face 20'.

Figures 7, 8:
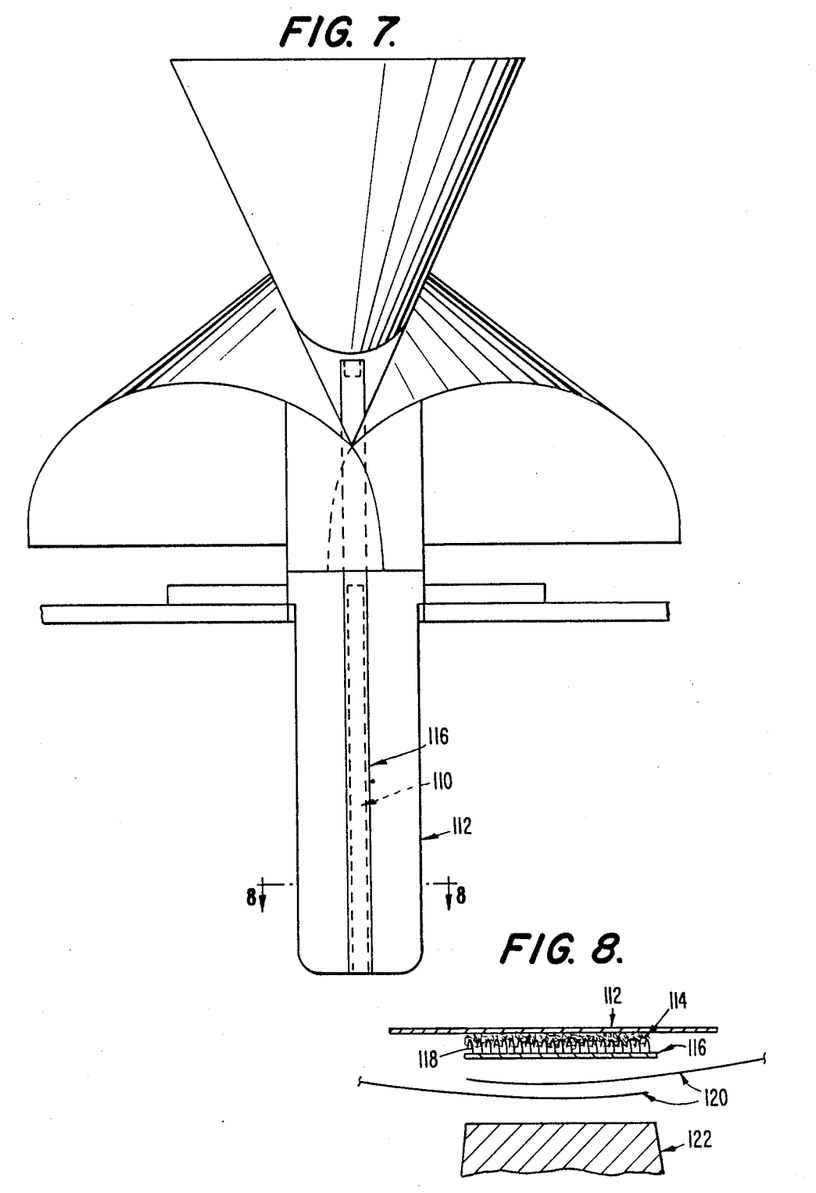
FIG. 7 is a partly schematic, elevation view showing a bag-forming apparatus with sealing die removed, utilizing a back-up pad in accordance with another embodiment of the present invention for forming lap-type seals.
FIG. 8 is a cross-sectional, partly schematic view along line 8—8 of FIG. 7, with the sealing die in place.
Figure 11:
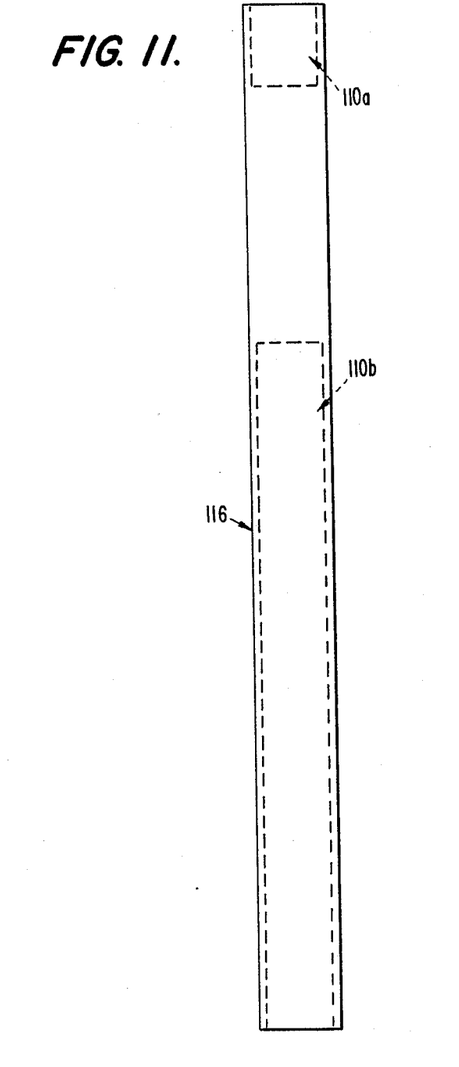
FIG. 11 is a somewhat schematic illustration of a back-up pad and support pad members according to one embodiment of the present invention.

FIGS. 7 and 8 illustrate a two-piece pad in an apparatus for forming lap-type seals. According to this embodiment, a support pad 110 is adhesively and/or mechanically attached the working surface of anvil 112, the support pad including a spring surface that is made up of a plurality of outwardly extending resilient spring loops 114. A corresponding backup pad 116 having spring loops also is provided, and the spring loops on at least one of the support pad 110 and the backup pad 116 are cut, so that the loops of the support and the backup pad interact to hold the backup pad onto the support pad. In the embodiment shown in FIGS. 7 and 8 the backup pad 116 has a plurality of cut loops 118 which interact with the intact loops of the support pad to hold the back-up pad in place for the sealing of the polymeric film layers 120 between the anvil 112 and the sealing die 122. FIG. 11 details one embodiment wherein the support pad is comprised of separate members 110a and 110b which are attached to the anvil, with a one piece back-up pad 116 having cut-loops which interact with the closed loops of the support pad members 110a and 110b.

Figure 9:
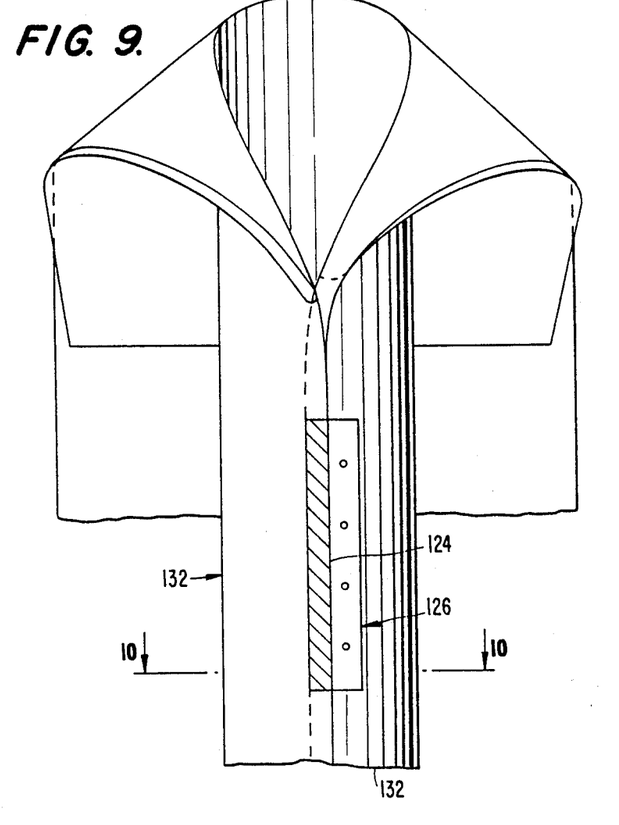
FIG. 9 is a partly schematic, elevation view showing a bag-forming apparatus, with sealing die removed, of another embodiment of the invention for forming fin-type seals.
Figure 10:
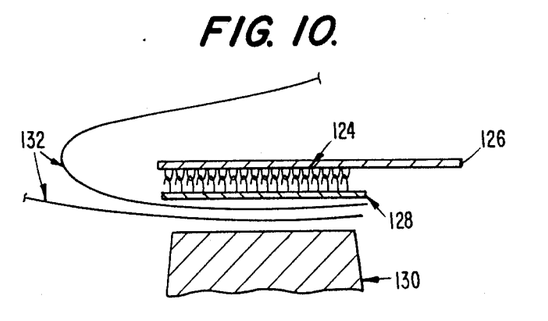
FIG. 10 is a partly schematic, cross-sectional view along line 10—10 of FIG. 9, with the sealing die in place.

In the embodiment shown in FIGS. 9 and 10, yet another modified form of the invention is utilized in an apparatus for forming a fold over or fin-type back seal. According to this embodiment, a closed loop support pad 124 is adhesively and/or mechanically attached to a tucker plate 126, so as to interact with and hold a cutloop back-up pad 128, against which sealing die 130 acts to seal the polymeric film layers 132.

The spring and slip surfaces of the back-up pad of the present invention provide consistently good quality seals at both "slip" and "dwell" areas of back seals, without damage to the film due to drag between the film layers. Use of polyester for the back-up pad provides the pads with good resistence to oils and high stability under a heated condition, and is fully acceptable by the U.S. Food and Drug Administration for incidental contact with a food product.

The invention is further illustrated by the following example, which is not intended to be limiting.

EXAMPLE I

A back-up pad as described above and shown in FIGS. 1-3 was formed by folding a two inch wide tape strip of modified Velcro TM having uncut loops, with the loops turned inward and opposing each other. The edges of this folded tape were sewn together with polyester thread to form a two-sided sleeve as shown in FIG. 3. If desired, the edges can be ultrasonically stitched. The sleeve was installed on a back up plate band as shown in FIG. 2 by sliding the back up plate band into the sleeve portion. The back-up pad then was used to form "lap" type back seals in a device as shown in FIG. 1. The back seals formed were of consistently good quality. When the sleeve becomes worn on one side, the two-sided sleeve can be reversed to utilize the slip surface on the second side of the sleeve.

Since many modifications, variations and changes in detail may be made to the described embodiments, it is intended that all matter in the foregoing description and shown in the accompanying drawings be interpreted as illustrative and not in a limiting sense.

I claim:

1. A method for longitudinally sealing a tube formed from polymeric plastic sheet film material comprising providing a back-up pad over an anvil surface of a back-up plate, and between the anvil surface and an opposing sealing face of a sealing die, the back-up pad having a slip surface on one side thereof and a spring surface on an opposite side thereof, the slip surface opposing the sealing face of the die, the spring surface comprising a plurality of outwardly extending resilient spring loops that act against the back-up plate during seal formation, the method further including the step of passing layers of sealable film material between the sealing die and the slip surface of the back-up pad while forming a seal between layers of film material, wherein said spring loops act against the back-up plate during seal formation and urge the layers of film material against the sealing face to effect seal formation between the layers of film material while cushioning the film layers to prevent damage to the film layers due to drag between the film layers and the die face.

2. An apparatus for longitudinally sealing a tube formed from polymeric plastic sheet film material, comprising a sealing die and a back-up plate between which layers of polymeric film pass for forming a seal between the film layers, the sealing die having a sealing face and the back-up plate having an anvil surface that opposes the sealing face of the die, the apparatus further including a back-up pad over the anvil surface of the back-up plate, the back-up pad having a slip surface on one side thereof and a spring surface on an opposite side thereof, the slip surface opposing the sealing face of the die so that said layers of film material pass between the sealing die and the back-up pad during seal formation, the spring surface comprising a plurality of inwardly extending resilient spring loops that act against the back-up plate during seal formation, the spring loops resiliently urging the layers of film material against the sealing face to effect seal formation between the film layers while cushioning the film layers to prevent damage to the film layers due to drag between the film layers and the die face.

3. The apparatus of claim 2, wherein the loops are formed of about 0.025–0.075 mm (about 0.001–0.003 inch) thickness monofilament polymeric material.

4. The apparatus of claim 3, wherein the loops are formed of about 0.05 mm (about 0.002 inch) thickness monofilament polymeric material.

5. The apparatus of claim 2, wherein the loops have a diameter of about 0.5–2.5 mm.

6. The apparatus of claim 2, wherein the loops have a diameter of about 1–2 mm.

7. The apparatus of claim 3, wherein the loops are in rows of about 6–10 loops/cm.

8. The apparatus of claim 7, wherein said rows are spaced at a density of about 8–14 rows/cm.

9. The apparatus of claim 2, wherein said loops are cut to form hooks, which hooks are embedded in a fibrous mat on said back-up plate.

10. The apparatus of claim 2, wherein said pad is in the form of a sleeve having opposing inner spring surfaces.

11. The apparatus of claim 2, wherein said pad is formed of polyester.

12. The apparatus of claim 2, further including a shield covering a top portion of the back-up pad and a portion of the back-up plate in a transition region between the back-up plate and the back-up pad.

13. An apparatus for longitudinally sealing a tube formed of sealable film material, comprising a sealing die and a back-up plate between which layers of polymeric film pass for forming a seal between the film layers, the sealing die having a sealing face and the back-up plate having an anvil surface that opposes the sealing face of the die, the apparatus further including a back-up pad and a support pad over the anvil surface of the back-up plate, the support pad including an attachment surface on one side thereof attached to the anvil surface and a spring surface on an opposite side thereof comprised of a plurality of outwardly extending resilient spring loops, the back-up pad having a slip surface on one side thereof and a spring surface on an opposite side thereof, the slip surface opposing the sealing face of the die so that said layers of film material pass between the sealing die and the back-up pad during seal formation, the spring surface comprising a plurality of inwardly extending resilient spring loops, the spring loops on at least one of the support pad and the back-up pad being cut to form cut loops so that the loops of the support pad and the back-up pad interact to hold the back-up pad onto the support pad, wherein the spring loops resiliently urge the layers of film material against the sealing face to affect seal formation between the film layers while cushioning the film layers to prevent damage to the film layers due to drag between the film layers and the die face.

14. The apparatus of claim 13, wherein the loops are formed of about 0.025–0.075 mm (about 0.001–0.003 inch) thickness monofilament polymeric material.

15. The apparatus of claim 14, wherein the loops are formed of about 0.05 mm (about 0.002 inch) thickness monofilament polymeric material.

16. The apparatus of claim 13, wherein the loops have a diameter of about 0.5–2.5 mm.

17. The apparatus of claim 13, wherein the loops have a diameter of about 1–2 mm.

18. The apparatus of claim 14, wherein the loops are in rows of about 6–10 loops/cm.

19. The apparatus of claim 18, wherein said rows are spaced at a density of about 8–14 rows/cm.

20. The apparatus of claim 13, wherein the loops of the back-up pad are cut to form hooks, which hooks are embedded in uncut loops on said support pad.

21. The apparatus of claim 13, wherein said back-up pad is formed of polyester.

* * * * *